(12) United States Patent
Barjhoux et al.

(10) Patent No.: US 12,516,878 B2
(45) Date of Patent: Jan. 6, 2026

(54) DEVICE AND METHOD FOR LIQUEFYING A FLUID SUCH AS HYDROGEN AND/OR HELIUM

(71) Applicant: L'Air Liquide, Societe Anonyme pour l'Etude et l'Exploitation des Procedes Georges Claude, Paris (FR)

(72) Inventors: Pierre Barjhoux, Sassenage (FR); Fabien Durand, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 225 days.

(21) Appl. No.: 18/276,799

(22) PCT Filed: Jan. 18, 2022

(86) PCT No.: PCT/EP2022/050973
§ 371 (c)(1),
(2) Date: Aug. 10, 2023

(87) PCT Pub. No.: WO2022/171390
PCT Pub. Date: Aug. 18, 2022

(65) Prior Publication Data
US 2024/0125547 A1    Apr. 18, 2024

(30) Foreign Application Priority Data
Feb. 10, 2021 (FR) .................................. FR 2101243

(51) Int. Cl.
*F25J 1/00*    (2006.01)
*F01D 15/00*   (2006.01)
*F25J 1/02*    (2006.01)

(52) U.S. Cl.
CPC .......... *F25J 1/0288* (2013.01); *F01D 15/005* (2013.01); *F25J 1/0007* (2013.01); *F25J 1/001* (2013.01);
(Continued)

(58) Field of Classification Search
CPC .. F25J 1/0007; F25J 1/001; F25J 1/005; F25J 1/0052; F25J 1/0062; F25J 1/0065;
(Continued)

(56) References Cited

U.S. PATENT DOCUMENTS 4,161,107 A    7/1979   Korsakov-Bogatkov et al.
4,530,744 A    7/1985   Smith
(Continued)

FOREIGN PATENT DOCUMENTS

CN    101 861 500    10/2010
CN    101 868 677    10/2010
(Continued)

OTHER PUBLICATIONS

Berstad, David O. et al., Large-scale hydrogen liquefier utilising mixed-refrigerant pre-cooling, Int'l Journal of Hydrogen Energy 35 (2010) 4512-4534.
(Continued)

*Primary Examiner* — Filip Zec
(74) *Attorney, Agent, or Firm* — Justin K. Murray (57) ABSTRACT

Disclosed is a device for liquefying a fluid, comprising a fluid circuit to be cooled, the device comprising a heat exchanger assembly in heat exchange with the fluid circuit to be cooled, at least one first cooling system in heat exchange with at least a portion of the heat exchanger assembly, the first cooling system being a refrigerator having a cycle for refrigerating a cycle gas mainly comprising helium, said refrigerator comprising in series in a cycle circuit: a mechanism for compressing the cycle gas, at least (Continued)

one member for cooling the cycle gas, a mechanism for expanding the cycle gas, and at least one member for reheating the expanded cycle gas, wherein the compression mechanism includes at least four compression stages in series composed of a centrifugal compressor assembly, the compression stages being mounted on shafts that are rotationally driven by a motor assembly, the expansion mechanism comprising at least three expansion stages in series composed of a set of centripetal turbines, the at least one member for cooling the cycle gas being configured to cool the cycle gas at the outlet of at least one of the turbines, and wherein at least one of the turbines is coupled to the same shaft as at least one compression stage so as to feed the mechanical work produced during the expansion to the compression stage.

14 Claims, 6 Drawing Sheets

(52) U.S. Cl.
CPC .............. *F25J 1/005* (2013.01); *F25J 1/0052* (2013.01); *F25J 1/0065* (2013.01); *F25J 1/0072* (2013.01); *F25J 1/0205* (2013.01); *F25J 1/0215* (2013.01); *F25J 1/0284* (2013.01); *F25J 1/0289* (2013.01); *F25J 1/0292* (2013.01); *F05D 2260/20* (2013.01); *F25J 2230/08* (2013.01); *F25J 2230/20* (2013.01); *F25J 2230/22* (2013.01); *F25J 2230/42* (2013.01); *F25J 2240/04* (2013.01); *F25J 2270/16* (2013.01)

(58) Field of Classification Search
CPC ........ F25J 1/0072; F25J 1/0205; F25J 1/0214; F25J 1/0215; F25J 1/0271; F25J 1/0279; F25J 1/0284; F25J 1/0288; F25J 1/0289; F25J 1/0292; F25J 1/0298; F25J 2205/82; F25J 2230/06; F25J 2230/08; F25J 2230/20; F25J 2230/22; F25J 2230/42; F25J 2240/04; F25J 2270/16; F25J 2290/34
See application file for complete search history.

(56) References Cited

U.S. PATENT DOCUMENTS

| | | | |
|---|---|---|---|
| 5,205,134 A | 4/1993 | Gistau-Baguer | |
| 6,298,688 B1 | 10/2001 | Brostow et al. | |
| 10,859,313 B2* | 12/2020 | Zhao | F25J 3/0242 |
| 10,866,022 B2* | 12/2020 | Krishnamurthy | F25J 1/005 |
| 11,635,252 B2* | 4/2023 | Liu | F25J 1/0072 |
| | | | 62/613 |
| 2006/0225461 A1 | 10/2006 | Paradowski | |
| 2010/0135825 A1 | 6/2010 | Walth | |
| 2010/0263405 A1 | 10/2010 | Durand et al. | |
| 2010/0275616 A1 | 11/2010 | Saji et al. | |
| 2014/0245780 A1* | 9/2014 | Wyllie | F25J 1/0057 |
| | | | 62/613 |
| 2017/0167785 A1* | 6/2017 | Pierre, Jr. | F25J 1/0234 |
| 2017/0343012 A1 | 11/2017 | Augy et al. | |
| 2018/0017320 A1* | 1/2018 | Bahari | F25J 1/0055 |
| 2018/0038643 A1* | 2/2018 | Roesch | F25J 1/0037 |
| 2018/0058753 A1* | 3/2018 | Mak | F25J 1/0265 |

FOREIGN PATENT DOCUMENTS

| | | |
|---|---|---|
| CN | 108 036 582 | 5/2018 |
| CN | 112 212 534 | 1/2021 |
| EP | 2211124 A1 | 7/2010 |
| EP | 3249319 A1 | 11/2017 |
| EP | 3702588 A1 | 9/2020 |
| EP | 3368630 B1 | 12/2020 |
| FR | 3086707 A1 | 4/2020 |
| FR | 3098574 A1 | 1/2021 |
| JP | H02171579 A | 7/1990 |
| JP | H05203343 A | 8/1993 |
| JP | 2007205667 A | 8/2007 |
| JP | 2010 025438 A | 2/2010 |
| JP | 2010025438 | 2/2010 |
| WO | 2017013213 A1 | 1/2017 |

OTHER PUBLICATIONS

He, T. et al., Optimal synthesis of expansion liquefaction cycle for distributed-scale LNG (liquefied natural gas) plant, Energy 88 (2015) 268-280.
Quack, H. et al., Nelium, a refrigerant with high potential for the temperature range between 20 and 70 K, Physics Procedia 67 (2015) 176-182.
Saji, N. et al., Design of oil-free simple turbo type 65 K-6 helium and neon mixture gas refrigerator for high temperature superconducting power cable cooling, AIP Conference Proceedings 613 (2020), published online May 15, 2002, 893-900.
Valenti, G. et al., Proposal of an innovative, high-efficiency, large-scale hydrogen liquefier, Int'l Journal of Hydrogen Energy 33 (2008) 3116-3121.
French Search Report for corresponding FR 2101243, Oct. 2, 2021.
International Search Report and Written Opinion for corresponding PCT/EP2022/050973, Jun. 10, 2022.

* cited by examiner

DEVICE AND METHOD FOR LIQUEFYING A FLUID SUCH AS HYDROGEN AND/OR HELIUM

CROSS REFERENCE TO RELATED APPLICATIONS

This application is a § 371 of International PCT Application PCT/EP2022/050973, filed Jan. 18, 2022, which claims the benefit of FR2101243, filed Feb. 10, 2021, both of which are herein incorporated by reference in their entireties.

FIELD OF THE INVENTION

The invention relates to a device and a method for liquefying a fluid such as hydrogen and/or helium.

BACKGROUND OF THE INVENTION

The prior-art solutions for liquefying hydrogen (H2) incorporate cycle compressors which obtain relatively low isothermal efficiencies (of about 60% to 65%) and have a relatively limited volumetric capacity at the cost, however, of quite considerable investment and high maintenance costs.

Document EP3368630 A1 describes a known method for liquefying hydrogen.

An aim of the present invention is to overcome all or some of the drawbacks of the prior art outlined above.

SUMMARY OF THE INVENTION

In certain embodiments, the invention more particularly relates to a device for liquefying a fluid such as hydrogen and/or helium, comprising a circuit for fluid that is to be cooled having an upstream end intended to be connected to a source of gaseous fluid and a downstream end intended to be connected to a member for collecting the liquefied fluid, the device comprising an assembly of heat exchanger(s) in a heat exchange relationship with the circuit for fluid that is to be cooled, the device comprising at least one first cooling system in a heat exchange relationship with at least part of the assembly of heat exchanger(s), the first cooling system being a refrigerator that performs a refrigeration cycle on a cycle gas mainly comprising helium, said refrigerator comprising the following disposed in series in a cycle circuit: a mechanism for compressing the cycle gas, at least one member for cooling the cycle gas, a mechanism for expanding the cycle gas and at least one member for heating the expanded cycle gas, wherein the compression mechanism comprises at least four compression stages in series composed of an assembly of compressor(s) of the centrifugal type, the compression stages being mounted on shafts that are driven in rotation by an assembly of motor(s), the expansion mechanism comprising at least three expansion stages in series composed of an assembly of turbines of the centripetal type.

In an effort to overcome the deficiencies of the prior art discussed, supra, the device according to the invention, which is otherwise in accordance with the generic definition thereof given in the preamble above, can include the at least one member for cooling the cycle gas that is configured to cool the cycle gas at the outlet of at least one of the turbines and wherein at least one of the turbines is coupled to the same shaft as at least one compression stage so as to supply mechanical work produced during the expansion to the compression stage.

As a result, by contrast to the prior-art methods, which intend to reach significant compression rates via cycle compressors of the volumetric type, the invention uses centrifugal compression which makes it possible to obtain markedly higher isothermic efficiencies (for example greater than 70% and typically close to 75-80%) in spite of relatively low compression rates.

In addition, by contrast to the prior art, the invention enables active recovery of the expansion work, notably of the cycle gas between 80K and 20K, thereby increasing the efficiency of the installation.

Preferably, the compression of the cycle gas is integrally centrifugal and uses a cycle fluid mainly comprising helium or made up of pure helium. This enables advantageous use of this type of compressor and mechanical integration of the expansion work of the turbines directly connected to the compression station.

Moreover, embodiments of the invention may have one or more of the following features:
- the compression mechanism comprises solely compressors of the centrifugal type,
- the at least one member for cooling the cycle gas comprises an assembly of heat exchanger(s) disposed at the outlet of at least some of the turbines,
- the device comprises a system for cooling the cycle gas, such as a heat exchanger, disposed at the outlet of at least some of the turbines except for the last turbine in series along the direction of circulation of the cycle gas,
- along the direction of circulation of the cycle gas, at least two turbines in series are coupled respectively to compression stages considered in the reverse order of their disposition in series, that is to say that, for example, at least one turbine is coupled to a compression stage located upstream of a compression stage coupled to another turbine which precedes it in the cycle circuit,
- the working pressure of at least one turbine coupled to a compression stage is adjusted to the working pressure of the compressor comprising the compression stage to which said at least one turbine is coupled, that is to say that the pressure of the cycle gas entering the turbine differs from the inlet pressure of the compressor to which said at least one turbine is coupled by no more than 40% and preferably no more than 30% or 20%,
- the mechanical coupling of the turbines and of the compression stages to one and the same shaft is configured to ensure an identical rotational speed of the turbine and of the compression stages that are coupled,
- the device comprises more compression stages than it does turbines, each turbine being coupled to the same shaft as a single respective compression stage driven by a respective motor, the other compression stages that are not coupled to a turbine being mounted only on rotary shafts driven by separate respective motors,
- the compression stages that are coupled to a turbine and the compression stages that are not coupled to a turbine alternate in series in the cycle circuit,
- the device comprises sixteen compression stages and eight turbines, or twelve compression stages and six turbines, or eight compression stages and four turbines, or six compression stages and three turbines, or four compression stages and three turbines,
- the cycle circuit comprises a return pipe having a first end connected to the outlet of one of the turbines and a second end connected to the inlet of one of the compression stages other than the first compression stage, for returning part of the flow of the cycle gas to the compression mechanism at an intermediate pressure level between the low pressure at the inlet of the compression mechanism and the higher pressure at the outlet of the compression mechanism, the return pipe is in a heat exchange relationship with the at least one member for cooling the cycle gas and/or the member for heating the expanded cycle gas, the cycle circuit comprises a partial bypass pipe for the flow of cycle gas, having a first end connected upstream of a turbine and a second end connected to the inlet of another turbine located downstream, said bypass pipe being configured to transfer part of the flow of cycle gas directly to the inlet of the coldest downstream turbine, the assembly of heat exchanger(s) comprises a plurality of heat exchangers which are disposed in series and in which two separate portions of the cycle circuit perform circulation simultaneously in countercurrent operation for respectively the cooling and the heating of the cycle gas, said plurality of heat exchangers forming a member for cooling the cycle gas and a member for heating the cycle gas, the device comprises a second cooling system in a heat exchange relationship with at least part of the assembly of heat exchanger(s), said second cooling system comprising a circuit for heat-transfer fluid such as liquid nitrogen or a mixture of refrigerants, the cycle gas is made up of helium or a mixture comprising at least 50% helium, the cycle circuit comprises, at the inlet of at least one of the turbines, an inlet guide vane ("IGV") configured to adjust the flow rate of fluid to a determined operating point, the working pressures of the turbines are set respectively to the working pressures of the compressors to which said turbines are coupled, such that the pressure of the cycle gas entering the turbine differs from the outlet pressure of the two compressors in series to which said turbines are coupled by no more than 30% and preferably no more than 20%.

In another embodiment, the invention can also relate to a method for producing hydrogen at cryogenic temperature, notably liquefied hydrogen, using a device according to any one of the features above or below, in which the pressure of the cycle gas at the inlet of the mechanism for compressing the cycle gas lies between two and forty bar abs and notably lies between eight and thirty five bar abs.

The invention may also relate to any alternative device or method comprising any combination of the features above or below within the scope of the claims.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1:
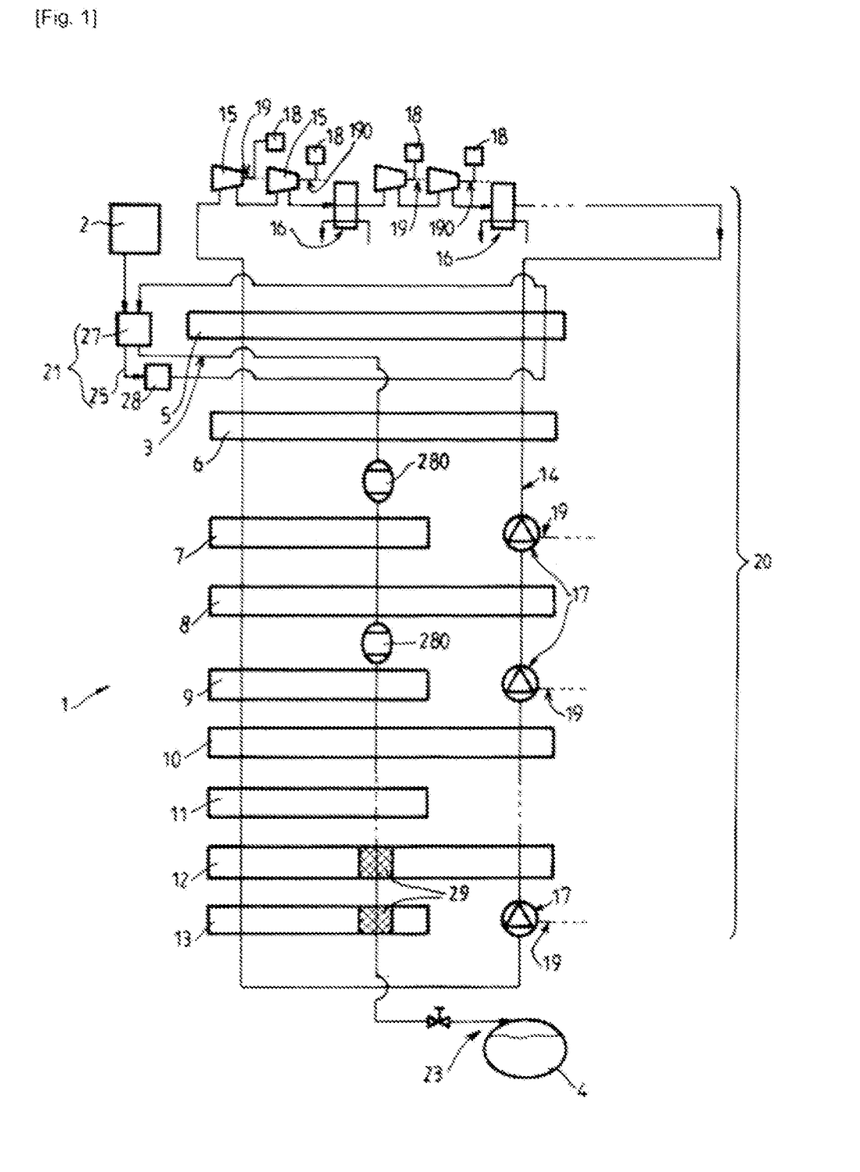
FIG. 1 shows a schematic and partial view illustrating the structure and the operation of a first possible exemplary embodiment of the invention.

The device 1 for liquefying a fluid that is shown in [FIG. 1] is intended for the liquefaction of hydrogen but can also be applied to other gases, notably helium or any mixture.

The device 1 comprises a circuit 3 for fluid that is to be cooled (notably hydrogen) having an upstream end intended to be connected to a source 2 of gaseous fluid and a downstream end 23 intended to be connected to a member 4 for collecting the liquefied fluid. The source 2 may comprise typically an electrolyzer, a hydrogen distribution network, a steam methane reforming (SMR) unit or any other suitable source(s).

The device 1 comprises an assembly of heat exchanger(s) 6, 7, 8, 9, 10, 11, 12, 13 disposed in series in a heat exchange relationship with the circuit 3 for fluid that is to be cooled.

The device 1 comprises at least one cooling system 20 in a heat exchange relationship with at least part of the assembly of heat exchanger(s) 5, 6, 7, 8, 9, 10, 11, 12, 13.

This first cooling system 20 is a refrigerator that performs a refrigeration cycle on a cycle gas mainly comprising helium. This refrigerator 20 comprises the following, disposed in series in a cycle circuit 14 (preferably in a closed loop): a mechanism 15 for compressing the cycle gas, at least one member 16, 5, 6, 8, 10, 12 for cooling the cycle gas, a mechanism 17 for expanding the cycle gas and at least one member 13, 12, 11, 10, 9, 8, 7, 6, 5 for heating the expanded cycle gas.

As a result, the fluid that is to be liquefied (for example hydrogen) is a fluid which is separate from the fluid of the cycle gas (for example helium and possibly one or more other component(s)).

Preferably, these two circuits are thus separate.

As illustrated, the assembly of heat exchanger(s) which cools the hydrogen that is to be liquefied preferably comprises one or multiple countercurrent heat exchangers 5, 6, 8, 10, 12 which are disposed in series and in which two separate portions of the cycle circuit 14 perform circulation simultaneously in countercurrent operation (respectively for the cooling and the heating of separate flows of the cycle gas).

That is to say that this plurality of countercurrent heat exchangers forms both a member for cooling the cycle gas (after the compression and after expansion stages, for example) and a member for heating the cycle gas (after the expansion and before return to the compression mechanism).

The compression mechanism comprises at least four compression stages 15 composed of an assembly of compressors of the centrifugal type which are disposed in series (and possibly in parallel).

A compression stage 15 may be composed of a wheel of a motorized centrifugal compressor.

The compression stages 15 (that is to say the compressor wheels) are mounted on shafts 19, 190 that are driven in rotation by an assembly of motor(s) 18 (at least one motor). Preferably, all the compressors 15 are of the centrifugal type.

For its part, the expansion mechanism comprises at least three expansion stages formed of turbines 17 of the centripetal type that are disposed at least partially in series. For example, the number of compression stages (for example the number of compression wheels) is greater than the number of expansion stages (for example number of expansion wheels). Preferably, all the turbines 17 are of the centripetal type and are mainly disposed in series.

The at least one member 16, 5, 6, 8, 10, 12 for cooling the cycle gas is notably configured to cool the cycle gas at the outlet of at least one of the turbines 17. That is to say that, after expansion in a turbine 17, the cycle gas can be cooled by a value typically lying between 2K and 30K.

In addition, at least one of the turbines 17 is coupled to the same shaft 19 as a compression stage 15 of a compressor so as to supply mechanical work produced during the expansion to the compressor.

This combination of particular technical features (centrifugal compression, centripetal expansion, transfer of work from the turbines to the compressors, etc.) is possible with a cycle gas comprising helium. Specifically, this makes it possible to decorrelate (make independent) the method with heat-transfer fluid (helium-based cycle gas) from the delivery temperature of the fluid that is to be liquefied (hydrogen, for example). This makes it possible in particular, in the cycle circuit 14, to increase the value of the low pressure level of the cycle gas to pressures which are higher than in the known devices. This is possible in spite of a relatively low overall compression rate of the cycle gas. This centrifugal compression technology would generally not be recommended for the liquefaction of hydrogen in the prior art owing to the limitation of the compression rate per stage.

As a result, the device 1 may have one or more motor-driven turbocompressors in part of the compression station. A motor-driven turbocompressor is an assembly comprising a motor of which the shaft directly drives an assembly of compression stage(s) (wheel(s)) and an assembly of expansion stage(s) (turbine(s)). This makes use of the mechanical expansion work directly at one or more compressors of the cycle gas.

For example, and as illustrated, the device 1 comprises more compression stages 15 than turbines 17, for example twice as many or approximately twice as many. Each turbine 17 can be coupled to the same shaft 19 as a single respective compressor wheel 15 that is driven by a respective motor 18. It is possible for the one or more other compressor wheels 15 (stage(s)) that are not coupled to a turbine 17 to be mounted only on rotary shafts 190 driven by separate respective motors 18 (motor-driven compressor).

As illustrated, the compression stages 15 that are coupled to a turbine 17 and the compressors that are not coupled to a turbine 17 may alternate in series in the cycle circuit 14.

Preferably, the compression mechanism comprises more than six compression stages in series. Of course, this is in no way limiting, since it is possible to envisage for example a less effective configuration with three compression stages in series, which would make it possible to liquefy hydrogen. The minimum compression rate (by the centrifugal technology) for achieving the liquefaction of hydrogen should preferably be about 1.3 to 1.6.

Four compression stages 15 in series make it possible notably to obtain very good isothermic efficiency in relation to the known solutions of piston compression, at the cost of a relatively significant mass flow rate of helium.

In the nonlimiting example illustrated in [FIG. 1], only four compression stages 15 and three turbines 17 are shown, but the device 1 could comprise eight compression stages 15 and four turbines 17. Any other distribution can be envisaged, for example sixteen compression stages 15 and eight turbines 17, or twelve compression stages and six turbines, or six compression stages and three turbines, or four compressors and three turbines, etc.

Cooling can be provided downstream of all or some of the compression stages or downstream of all or some of the compressors 15 (for example via a heat exchanger 16 cooled by a heat-transfer fluid or any other refrigerant). This cooling can be provided after each compression stage or, as illustrated, every two compression stages 15 (or more) or solely downstream of the compression station. Surprisingly, this distribution of the cooling not at the outlet of each of the compression stages 15 in series but every two (or three) compression stages 15 makes it possible to obtain cooling performance whilst still limiting the costs of the device 1.

Similarly, the at least one member for cooling the cycle gas preferably comprises a system 8, 10, 12 for cooling the cycle gas, such as a heat exchanger, disposed at the outlet of at least some of the turbines 17 in series.

This intermediate inter-expansion cooling makes it possible to limit the value of the high pressure necessary to reach the coldest temperatures of the cycle gas.

As illustrated, the device 1 preferably comprises a system for cooling the cycle gas, such as a heat exchanger, at the outlet of all of the turbines 17 except for the last turbine 17 in series along the direction of circulation of the cycle gas. As illustrated, this cooling system can be provided by aforementioned respective countercurrent heat exchangers 8, 10, 12.

This cooling after expansion enables temperature staging (that is to say, makes it possible to reach distinct, ever-lower temperatures after each expansion stage) to extract cold at the fluid that is to be cooled. This temperature staging is obtained by this arrangement and via a minimum compression rate obtained for supplying these various turbines 17.

The arrangement of multiple centrifugal compression stages 15 in series upstream makes it possible to obtain this pressure differential which enables sufficient staging of the cooling downstream. Specifically, for the same pressure difference, the more the temperature decreases, the more the constant entropic drop in enthalpy during the expansion decreases. The effect of the arrangement of the turbines 17 in series and the cooling 8, 10 at the outlet of the turbines is to increase the mean mass flow rate in the turbines 17 in relation to known conventional staging. The theoretical isentropic efficiency thus tends to increase and therefore makes it possible to obtain better efficiencies of the turbines 17.

In particular, the cooling 8, 10 between the expansion stages allows the cycle fluid to reach the target liquefaction temperatures without requiring an even greater overall compression rate. The expansions are preferably isentropic or virtually isentropic. That is to say that the cycle fluid is cooled progressively and the fluid liquefies.

As a result, the minimum temperature is reached directly at the outlet of the last virtually isentropic expansion stage (that is to say downstream of the last expansion turbine 17). It is therefore not necessary to provide in addition an expansion valve of the Joule-Thomson type downstream, for example. The cold and notably a supercooling temperature of the hydrogen that is to be liquefied can be obtained exclusively with the turbines 17 (extraction of work).

Preferably, most or all of the turbines 17 are coupled to one or more respective compressors 15.

For example, along the direction of circulation of the cycle gas, the successive turbines 17 are preferably coupled to compression stages 15 of compressors considered in the reverse order of their disposition in series. That is to say that, for example, a turbine 17 is coupled to a compressor 15 located upstream of a compressor 15 coupled to the turbine 17 which precedes it.

The order in which the turbines 17 and compressors that are coupled are connected is therefore preferably at least partially reversed between the turbines and the compressors (in the cycle circuit, a turbine further upstream is coupled to a compressor further downstream).

Thus, in the case for example of an architecture with six compression stages 15 in series and three expansion stages in series, the first turbine 17 (that is to say the first turbine 17 after the compression mechanism) can be coupled to the fifth compressor 15 in series (fifth compression stage), while the second turbine 17 can be coupled to the third compressor 15 in series (third compression stage), the third turbine 17 can be connected to the first compressor 15 in series (first compression stage). It is possible for the other compressors 15 forming the other compression stages not to be coupled to a turbine (motor-driven compressor system and not motor-driven turbocompressors). As a result, the most powerful turbine 17 (the one furthest downstream) can be coupled to the first compression stage (the first compression stage intakes at the low pressure of the cycle). At this relatively low pressure level, the greater the compression rate of the compressor 15, the less the impact of the pressure drops at its level is felt (and so on with the other compressors 15).

This example above is, of course, in no way limiting. For example, the turbines 17 could be coupled respectively to the even-numbered compressors 15 (the first turbine with the sixth compressor, the second turbine with the fourth compressor, etc.) or with the compressors directly in series (for example the first turbine 17 with the sixth compressor 15, the tenth turbine with the fifth compressor, etc.).

Preferably, the working pressures of the turbines 17 are set respectively to the working pressures of the compressors 15 to which they are coupled. That is to say that the pressure of the cycle gas entering the turbine 17 differs from the outlet pressure of the compressor 15 to which it is coupled by no more than 40% and preferably no more than 30% or 20%. This makes it possible to reduce the axial loading on the output shafts 19 of the motors 18 in question which directly couple the compressor wheels 15 and turbines 17.

For example, the at least one turbine 17 and the corresponding compression stage that are coupled have a structural configuration such that the pressure of the cycle gas leaving the turbine 17 differs from the pressure of the cycle gas at the inlet of the compression stage 15 by no more than 40% and preferably no more than 30% or 20%.

Similarly, the at least one turbine 17 and the corresponding compression stage that are coupled preferably also (or possibly alternatively) have a structural configuration such that the pressure of the cycle gas entering the turbine 17 differs from the pressure of the cycle gas at the outlet of the compression stage by no more than 40% and preferably no more than 30% or 20%.

This combination of particular technical features (centrifugal compression, centripetal expansion, transfer of work from the turbines to the compressors and adjustment of the pressures between the coupled compression and expansion wheels) improves the efficiency of the device in relation to the known solutions.

This structural configuration of the turbine (for example turbine wheel) and compression stage (for example compression wheel) means that these two elements are dimensioned (shape and/or dimension of the wheel and/or of their volute and/or of their inlet distributor, if appropriate) to respectively perform compressions and expansions of the same or similar absolute value as specified above. That is to say that, by design, these two coupled elements could reach these compression and expansion ratios (without using another active or passive element in the cycle circuit), preferably irrespective of the conditions of the flow of cycle gas.

For example, the expansion rate at the terminals of the at least one turbine 17 coupled to a compression stage can be configured to lower the pressure of the cycle gas by a value which does not differ from the value of the increase in pressure at the terminals of the compression stage 15 to which it is coupled by more than 40% (or more than 20%).

For example, if the compressor 15 is coupled to the turbine 17 and operates between 10 bar and 15 bar (compression of the flow initially at 10 bar to an outlet pressure 15 bar), it is advantageous for the turbine 17 to make this flow expand to pressures of between 15 and 10 bar (inlet at 15 bar and outlet at 10 bar).

This improves the distribution and balancing of the axial forces of the shaft 19 which bears them.

Since the signs of the forces generated by the differences in pressure at the terminals of the wheels 15, 17 are opposite, this tends to reduce the resultant of the axial forces.

This preferably also applies in the case of multiple turbines in series coupled to one or more compressors 15.

Thus, as illustrated, the expansion mechanism may comprise at least two expansion stages in series composed of an assembly of turbines 17 of the centripetal type in series.

In addition, as mentioned above, along the direction of circulation of the cycle gas, at least two turbines 17 in series are preferably coupled respectively to compression stages 15 considered in the reverse order of their disposition in series. That is to say that at least one turbine 17 is coupled to a compression stage 15 located upstream of a compression stage 15 coupled to another turbine 17 which precedes it in the cycle circuit 14.

Preferably, the device comprises n turbines (expansion wheels or stages) and k compressor wheels or stages, where k>=n. The expansion rates selected at the terminals of each turbine 17 are preferably thus imposed as a function of the compressor to which they are coupled (as explained above).

In the example illustrated with alternation of a compressor 15 coupled to a turbine 17 and then a compressor 15 that is not coupled to a turbine, the working pressures of the turbines 17 can be set to the working pressures of the compressors 15 "one by one" or "two by two" (that is to say, the first turbine 17 works at the compression rate of the 5th or 6th compressors 15; similarly, the second turbine 17 works at the compression rate of the 3rd or 4th compressors, etc.). If consideration is given to a pair of two compressors 15 in series (a compressor with a compression wheel coupled to a turbine followed by a compressor with a compressor wheel that is not coupled to a turbine), the first one of these two compressors compresses for example the cycle gas to a first pressure PA while the second then compresses this cycle gas to a second pressure PB, where PB>PA. The turbine 17 which will be coupled to the first one of these two compressors will preferably expand the cycle gas from the second pressure PB to the first pressure PA. This can be obtained, for example, by regulating the characteristics of this turbine 17 in accordance with this constraint. For example, there is regulation of the cross section of the distributor calibrating the flow rate arriving at the turbine 17, this having an effect on the resulting pressure drop in the distributor part and the wheel part of the turbine.

As a result, for example when turbines are coupled every two compression stages in series, the pressure relationships described in detail above (inlet/outlet) between the expansion and compression stages that are coupled can thus be applied either solely to the compression stage that bears the turbine or to an assembly of two compressor wheels in series.

In addition, the one or more mechanical couplings of the turbines 17 and of the compression stages 15 to one and the same shaft 19 is (are) configured to ensure preferably an identical rotational speed of the turbine 17 and of the compression stages 15 that are coupled. This makes it possible to make direct and effective use of the expansion work in the device. If appropriate, the rotational speeds of all the compressor and turbine wheels can be equal at one and the same determined value.

A control member may optionally be provided for all or some of the compression stages. For example, a variable-frequency drive ("VFD") can be provided for each motor 18 driving at least one compression stage. This makes it possible to independently regulate the speeds of multiple compression stages or each compression stage and thus the expansion without using a complex system of gears or a drive and a specific control means linked to variable blade sets upstream of one or more compression stages. This speed controlling member may be provided for the assembly of compressors or for each compression stage.

Preferably, the device 1 does not comprise a flow valve or a valve for reducing the pressure in the circuit (pressure drop) between the compression stages, between the expansion stages or downstream of the expansion of the cycle. As a result, it is possible to provide only isolating valves for maintenance in the cycle circuit 14.

That is to say that the operating point of the turbines 17 (speed, pressure) can be adjusted solely by way of the dimensional features of the turbine 17 (no throttling valve at the turbine inlet, for example). This increases the reliability of the device (no potential problem involving failure of valves for controlling the process, since they are absent). This moreover makes it possible to eliminate expensive ancillary circuits (safety valves, etc.) and simplifies manufacture (reduction in the number of lines to isolate, etc.).

The use of a helium-based cycle gas makes it possible to reach temperatures with a view to supercooling liquefied hydrogen without the risk of a subatmospheric zone within the process (this would be dangerous if the cycle fluid were hydrogen) and without the risk of freezing of the cold source (the maximum liquefaction temperature of helium is equal to 5.17 K). The effect of supercooling liquefied hydrogen has a very notable advantage for the transport chain of the hydrogen molecule and then potentially for users (typically liquid stations) by virtue of the reduction in boil-off gases during haulage.

It is thus possible to reach the gel point (13 K) of the flow of hydrogen that is to be liquefied without crystallizing the cold source.

The low-pressure portion of the cycle circuit 14 can be operated at a relatively high pressure. This makes it possible to reduce the volumetric flow rates in the heat exchangers 6, 7, 8, 9, 10, 11, 12, 13. The working pressure of the cycle gas can thus be decorrelated from the target pressure or temperature of the fluid that is to be cooled. This pressure of the cycle gas can thus be increased to adapt to the stresses of the turbomachine but also to reduce the volumetric flow rate at low pressure, which is generally one of the main parameters affecting the dimension of the heat exchangers.

This low pressure level in the cycle circuit 14 is for example greater than or equal to 10 bar and can typically lie between 10 and 40 bar. This reduces the volumetric flow rate in the heat exchangers, which counterbalances the low compression rate per compression stage.

As illustrated, the device 1 may comprise a second cooling system in a heat exchange relationship with at least part of the assembly of heat exchanger(s) 5 in a heat exchange relationship with the cycle gas, for example. This second cooling system 21 comprises, for example, a circuit 25 for heat-transfer fluid such as liquid nitrogen or a mixture of refrigerants which cools the cycle gas and/or the hydrogen that is to be liquefied through the first countercurrent heat exchanger or the multiple countercurrent heat exchangers, and can also make it possible to combat displacement losses at the hot end caused by circulating the one or more heat-transfer fluids in a closed loop, as illustrated in [FIG. 1] via at least one pre-cooling exchanger 5.

This second cooling system 21 makes it possible, for example, to pre-cool the fluid that is to be liquefied and/or the working gas at the outlet of the compression mechanism. This refrigerant circulating in the circuit 25 for heat-transfer fluid (for example in a loop) is for example supplied by a unit 27 for producing and/or storing 28 this refrigerant. If appropriate, the circuit 3 for fluid that is to be cooled passes through via this unit 27 in order to be pre-cooled upstream. It should be noted that it is conceivable for the device 1 to have one or more other additional cooling system(s). For example, a third cooling circuit fed by a chiller (for example supplying a cold source at a temperature typically lying between 5° C. and −60° C.) may be provided in addition to the aforementioned system. A fourth cooling system could also be provided to again supply cold to the device 1 and increase the liquefaction power of the device 1 if required. The embodiment of [FIG. 2] is distinguished from the preceding one solely in that the cycle circuit 14 comprises a return pipe 22 having a first end connected to the outlet of one of the turbines 17 (other than the last one in the downstream direction) and a second end connected to the inlet of one of the compressors 15 other than the first compressor 15 (in the upstream direction). This return pipe 22 makes it possible to return some of the flow of cycle gas to the compression mechanism at an intermediate pressure level between the low pressure at the inlet of the compression mechanism and the high pressure at the outlet of the compression mechanism.

Figure 2:
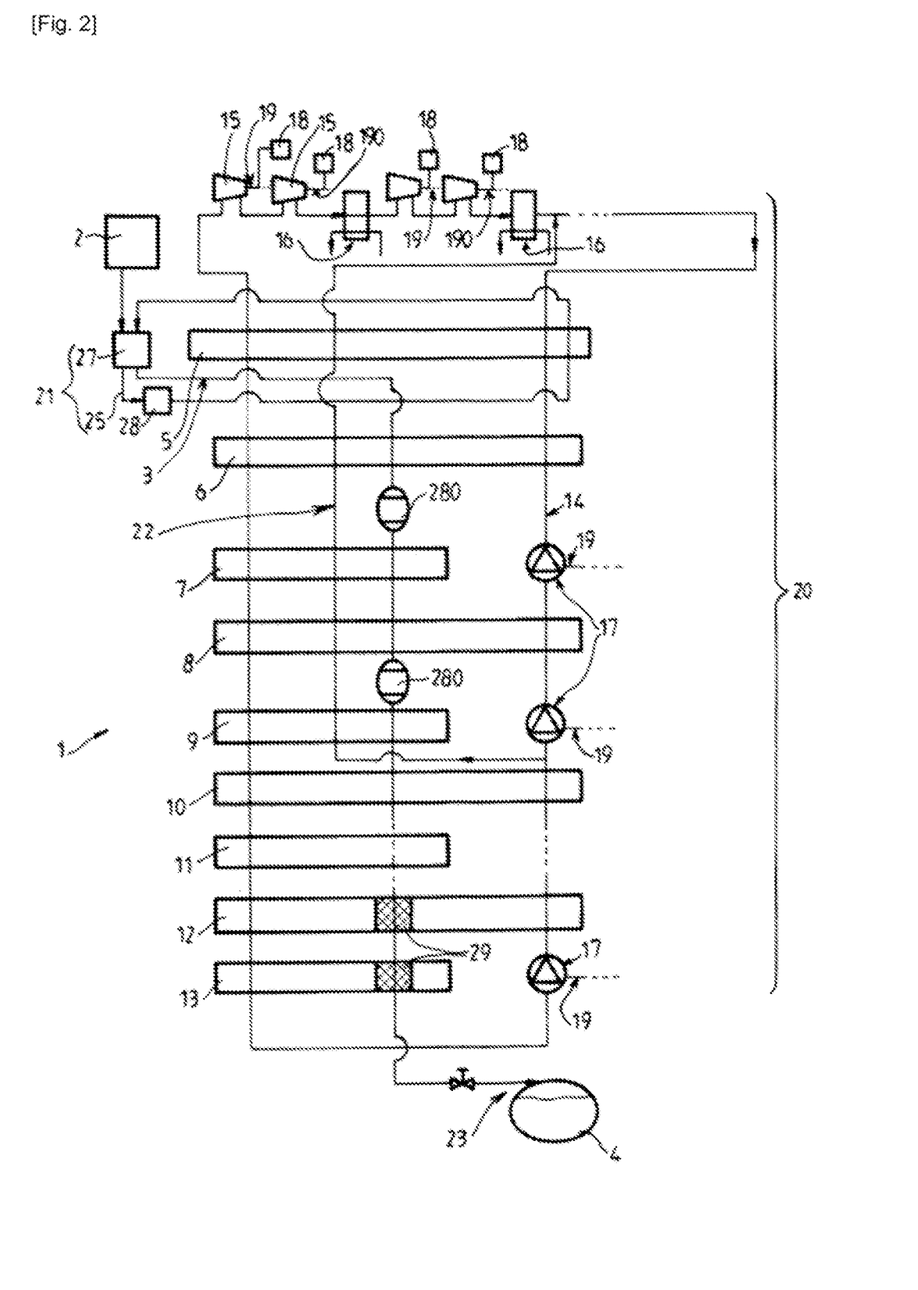
FIG. 2 shows a schematic and partial view illustrating the structure and the operation of a second possible exemplary embodiment of the invention.
Figure 3:
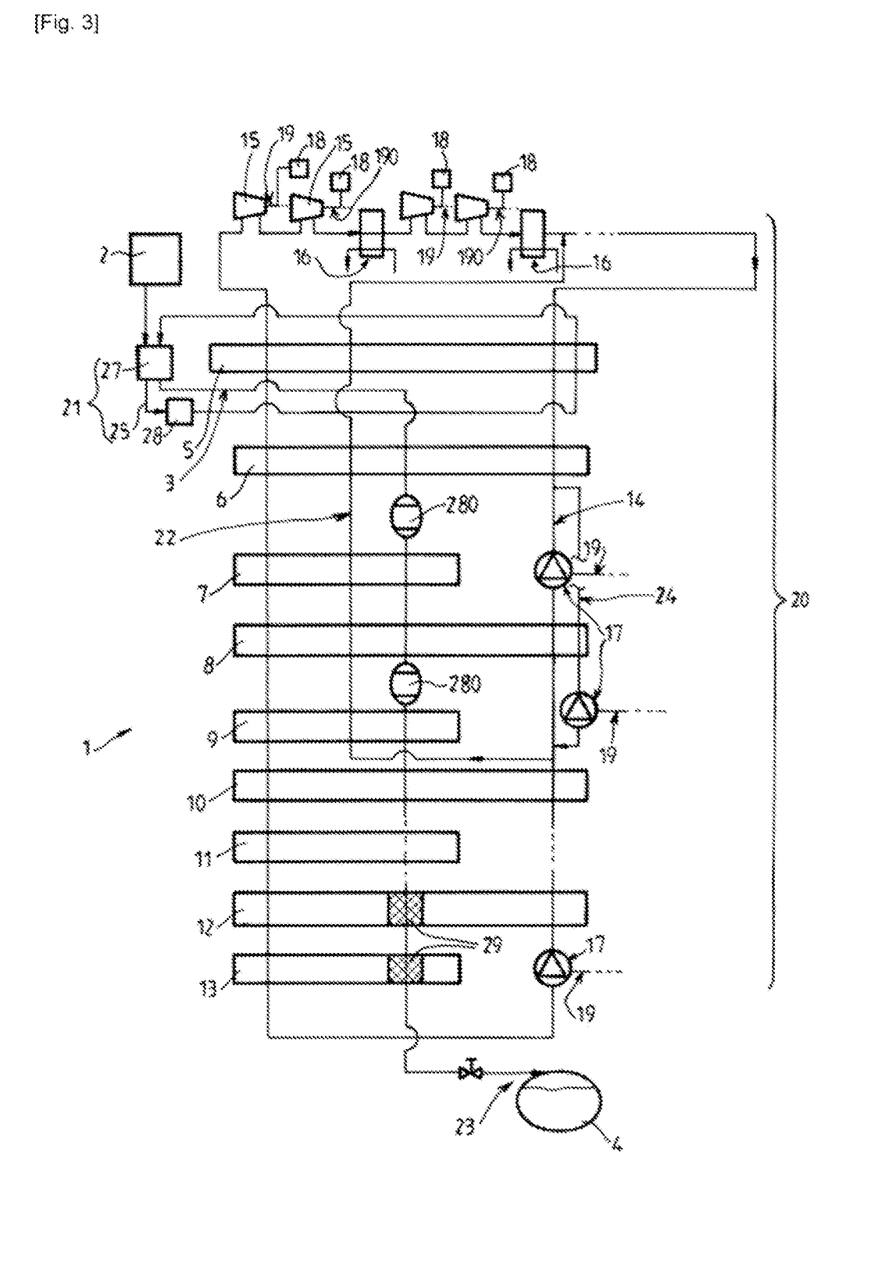
FIG. 3 shows a schematic and partial view illustrating the structure and the operation of a third possible exemplary embodiment of the invention.

The return pipe 22 may be in a heat exchange relationship with at least some of the countercurrent heat exchangers. Multiple return pipes to the compression station at intermediate pressure may advantageously be installed according to the expected level of optimization of the process. For example, the draw-off points (at the turbines under consideration) and injection points (at the compression stages under consideration) may be located at different pressure levels. The embodiment of [FIG. 3] is distinguished from the preceding one solely in that the cycle circuit 14 moreover comprises a partial bypass pipe 24 having a first end connected upstream of a turbine 17 (for example the first turbine 17 in the upstream direction) and a second end connected to the inlet of another turbine located downstream (for example the third turbine). For example, the bypass pipe 24 makes it possible to divert some of the flow of cycle gas exiting the compression mechanism at high pressure towards the coldest turbines further downstream. The rest of the flow enters this hotter, first upstream turbine 17. This makes it possible, depending on the positioning in terms of specific speed of the various turbines and compressors, to regulate the flow rates sent to the various stages. For example, the compressors located at higher pressure take in a lower volumetric flow rate than the first compression stages (located close to the low pressure of the process). One way of increasing this volumetric flow rate and thus to potentially increase their isentropic efficiency is to incorporate a return at intermediate pressure from the expansion stages, as shown in FIG. 3. The device 1 shown in [FIG. 4] illustrates yet another nonlimiting embodiment. The elements that are identical to those described above are denoted by the same reference numerals and are not described in detail again.

Figure 4:
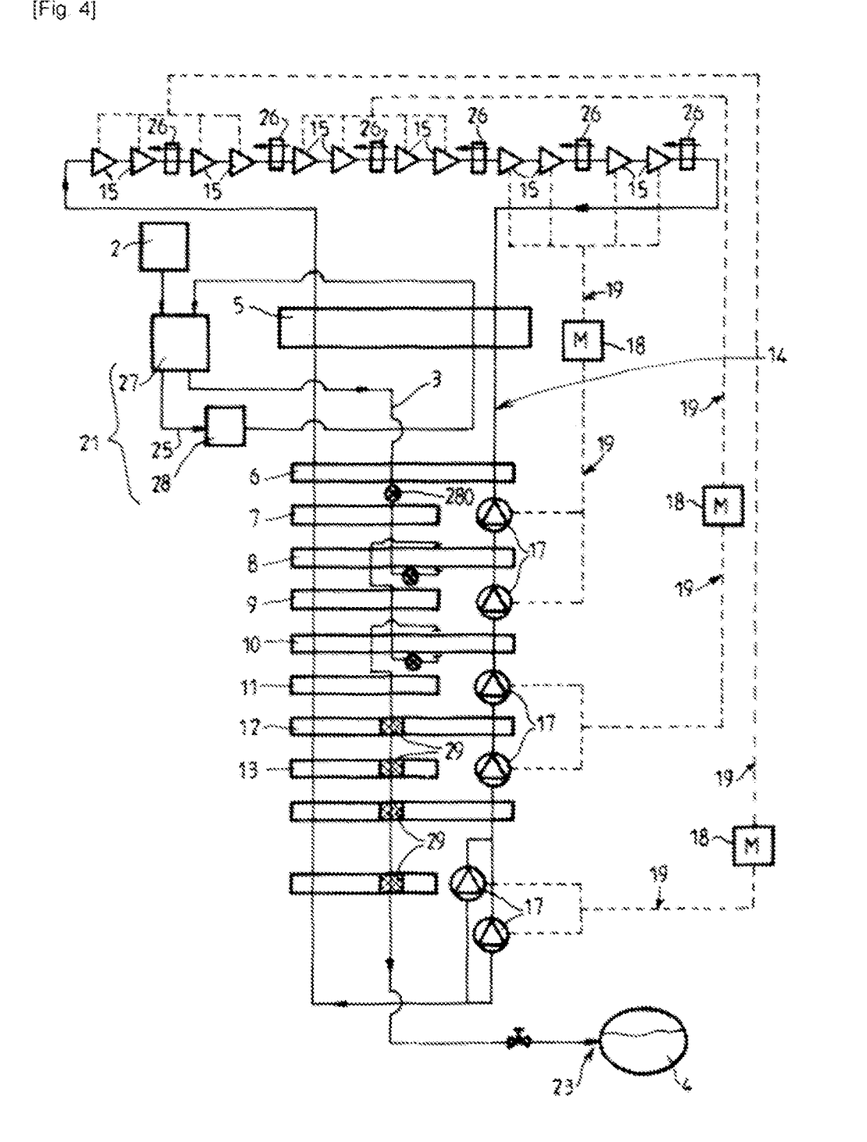
FIG. 4 shows a schematic and partial view illustrating the structure and the operation of a fourth possible exemplary embodiment of the invention.

The cycle circuit 14 of the device of [FIG. 4] comprises three compressors (driven respectively by three motors 18). As illustrated, each compressor may have four compression stages 15 (that is to say four compression wheels in series). These compressor wheels 15 may be mounted by direct coupling to one end of a shaft 19 of the motor 18 in question. In this example, the device thus has twelve centrifugal compression stages in series. As shown, cooling 26 of the cycle gas may be provided every two compression stages.

In this example, the device 1 has five expansion stages in series (six centripetal turbine wheels, two of which are disposed in parallel), for example one or two expansion stages per compressor. As illustrated, all of the turbines 17 may be coupled to a compressor shaft 19 (for example two turbines 17 are mounted at the other end of the shaft 19 of each motor 18 to supply mechanical work to the compressor wheels 15 that are also mounted on this shaft 19). Of course, the turbines 17 could be on the same side of the shaft 19 as the compression wheels 15. For example, the four first expansion stages are formed of four turbines 17 in series. The fifth expansion stage is for example formed of two turbines 17 disposed respectively in two branches in parallel of the cycle circuit 14. The device 1 shown in [FIG. 5] is distinguished from that of FIG. 4 in that it comprises return lines 122, 123, 124 for cycle gas that transfer some of the cycle gas leaving the turbines 17 at intermediate pressure levels (medium pressure) to the compression mechanism. For example, a line 124 connects the outlet of the first turbine to the outlet of the eighth compression stage. Similarly, a line 123 connects the outlet of the second turbine to the outlet of the sixth compression stage. Similarly, a line 122 connects the outlet of the third turbine 17 to the outlet of the fourth compression stage. Of course, the device could have just one or just two of these medium-pressure return lines. Similarly, other return lines could be envisaged. In addition, the ends of these lines could be changed (outlet of other turbine(s) and outlet(s) of other compression stages).

Figure 5:
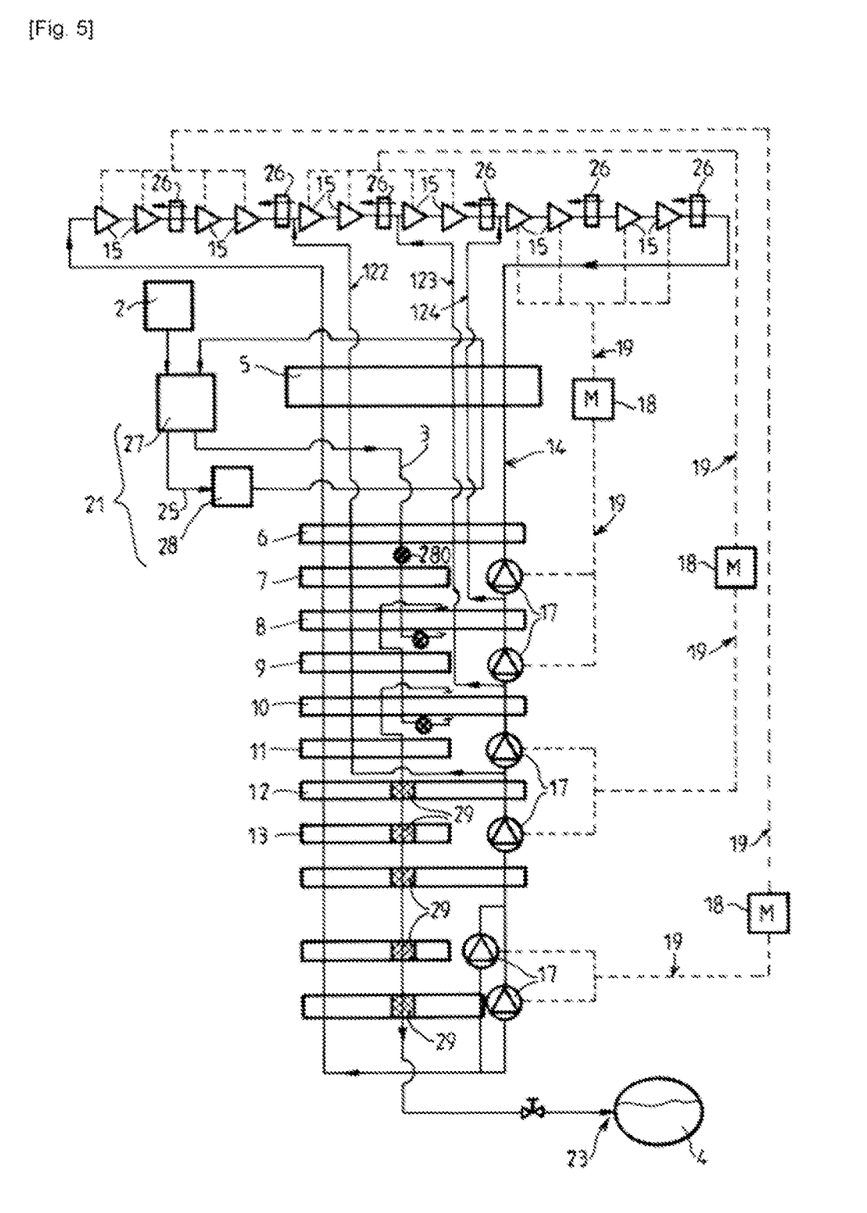
FIG. 5 shows a schematic and partial view illustrating the structure and the operation of a fifth possible exemplary embodiment of the invention.

This or these returns make it possible to increase the volumetric flow rate of the compressors thus supplied with a flow rate excess and thus to potentially increase their isentropic efficiency.

Figure 6:
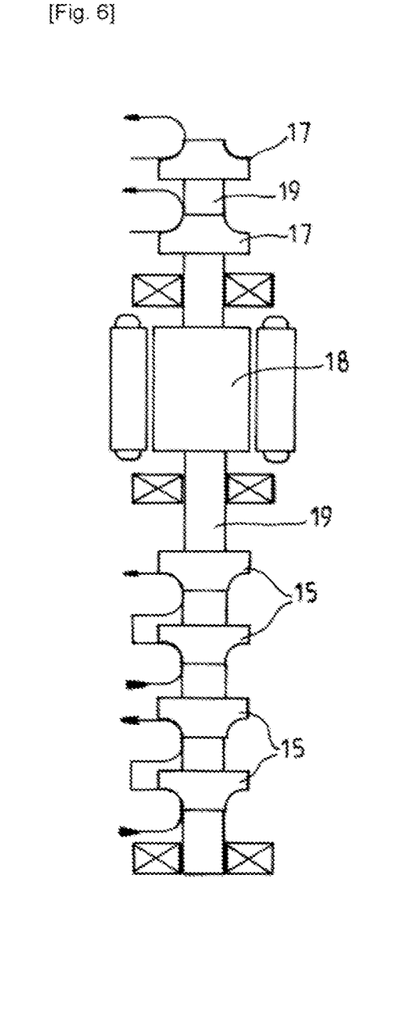
FIG. 6 shows a schematic and partial view illustrating a detail of the fourth possible exemplary embodiment of the invention illustrating a possible example of the structure and operation of a motor-driven turbocompressor of the device.

The device 1 shown in [FIG. 6] illustrates a detail of the device 1 illustrating a nonlimiting possible example of the structure and operation of a motor-driven turbocompressor arrangement. One end of the shaft 19 of the motor 18 drives four compressor wheels (four compression stages 15). The other end of the shaft 19 is coupled directly to two expansion stages (two turbines 17).

Of course, any other suitable type of arrangement of the compression stages 15 and expansion stage 17 (number and distribution) can be envisaged (likewise for the number of motors).

As a result, other modifications are possible.

Various configurations are thus possible for the turbines 17, notably for the downstream turbines (the coldest ones).

For example, as already illustrated, the two last expansion stages (two turbines) can be installed in parallel and not in series. This makes it possible to produce a greater drop in enthalpy at the terminals of these turbines. This would be realized to the detriment of the efficiency (since two turbines would share 100% of the flow rate and the difference in pressure available would be almost doubled). In spite of this potential drop in efficiency for these two last expansion stages, realizing a greater drop in enthalpy would be able to make it possible to stage the expansion more effectively.

This is because the same cold enthalpy differential causes a variation in temperature at the terminals of a turbine that is smaller than it is for a hotter turbine. This improves the efficiency of the refrigeration and liquefaction process. As a result, in spite of a relatively reduced temperature differential at the terminals of the turbines, the efficiency of the device makes it possible to liquefy hydrogen with good energy efficiency.

The temperature differential caused by the turbine 17 may be a function of the temperature of the cycle gas upstream of the turbine 17.

A buffer tank (not shown) and an assembly of valve(s) may be provided, preferably at the low pressure level, with the aim of limiting the maximum pressure for filling the cooling circuit with gas. Preferably, the minimum compression rate lies between 1.3 and 1.6 at the terminals of the compression station. The cycle gas may be composed of 100% or 99% helium and supplemented by hydrogen, for example.

The cycle circuit may comprise, at the inlet of at least one of the turbines 17, an inlet guide vane ("IGV") configured to adjust the flow rate of fluid to a determined operating point.

In addition, the arrangement of the compressor wheels 15 and/or turbines 17 is not limited to the examples above. As a result, the number and arrangement of the compressors 15 may be modified. For example, the compression mechanism could be composed of just three compressors, each compressor could be provided with multiple compression stages, for example three compression stages, that is to say three compressor wheels (with or without inter-stage cooling).

Similarly, two compression stages 15 could be disposed in parallel and in series with other compression stages (for example three in series). The two compression stages in parallel can be placed upstream of the others and thus supply, in the downstream direction, a relatively high flow rate at the low pressure by using machines which can all be identical.

In the same way, turbines 17 can be placed in parallel in the cycle circuit 14.

In addition, as already illustrated, all the turbines could be coupled to one or more compressor wheels (for example one or more turbines 17 coupled to the same shaft 17 as one or more compression stages).

As illustrated, the circuit 3 for fluid that is to be cooled can have one or more catalysis members (pot(s) 280) outside of exchangers or section(s) 29 of exchanger(s), for example for the conversion of hydrogen (ortho-hydrogen to para-hydrogen).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for liquefying a fluid such as hydrogen and/or helium, the device comprising:
    a circuit for fluid that is to be cooled having an upstream end configured to be connected to a source of gaseous fluid and a downstream end configured to be connected to a member for collecting the liquefied fluid;
    an assembly of heat exchanger(s) in a heat exchange relationship with the circuit for fluid that is to be cooled; and
    at least one first cooling system in a heat exchange relationship with at least part of the assembly of heat exchanger(s), the first cooling system comprising a refrigerator that is configured to perform a refrigeration cycle on a cycle gas comprising primarily of helium, wherein said refrigerator comprises the following disposed in series in a cycle circuit:
        a compression mechanism configured to compress the cycle gas,
        at least one cooling member configured to cool the cycle gas,
        an expansion mechanism configured to expand the cycle gas, and
        at least one heating member configured to heat the expanded cycle gas,
    wherein the compression mechanism comprises at least four compression stages in series composed of an assembly of compressor(s) of the centrifugal type, the compression stages being mounted on shafts that are driven in rotation by an assembly of motor(s),
    wherein the expansion mechanism comprises at least three expansion stages in series composed of an assembly of turbines of the centripetal type,
    wherein the at least one cooling member is configured to cool the cycle gas at the outlet of at least one of the turbines, and
    wherein at least one of the turbines is coupled to the same shaft as at least one compression stage so as to supply mechanical work produced during the expansion to the compression stage,
    wherein the device comprises more compression stages than turbines, wherein each turbine is coupled to the same shaft as a single respective compression stage driven by a respective motor, wherein the other compression stages that are not coupled to a turbine are mounted only on rotary shafts driven by separate respective motors,
    wherein the compression stages that are coupled to a turbine and the compression stages that are not coupled to a turbine alternate in series in the cycle circuit.

2. The device as claimed in claim 1, wherein the compression mechanism comprises solely compressors of the centrifugal type.

3. The device as claimed in claim 1, wherein the at least one member for cooling the cycle gas comprises an assembly of heat exchanger(s) disposed at the outlet of at least some of the turbines.

4. The device as claimed in claim 1, wherein it comprises a system for cooling the cycle gas, such as a heat exchanger, disposed at the outlet of at least some of the turbines except for the last turbine in series along the direction of circulation of the cycle gas.

5. The device as claimed in claim 1, wherein, along the direction of circulation of the cycle gas, at least two turbines in series are coupled respectively to compression stages considered in the reverse order of their disposition in series, that is to say that, for example, at least one turbine is coupled to a compression stage located upstream of a compression stage coupled to another turbine which precedes it in the cycle circuit.

6. The device as claimed in claim 1, wherein the working pressure of at least one turbine coupled to a compression stage is adjusted to the working pressure of the compressor comprising the compression stage to which said at least one turbine is coupled, that is to say that the pressure of the cycle gas entering the turbine differs from the inlet pressure of the compressor to which said at least one turbine is coupled by no more than 40% and preferably no more than 30% or 20%.

7. The device as claimed in claim 1, wherein the mechanical coupling of the turbines and of the compression stages to one and the same shaft is configured to ensure an identical rotational speed of the turbine and of the compression stages that are coupled.

8. The device as claimed in claim 1, wherein it comprises sixteen compression stages and eight turbines, or twelve compression stages and six turbines, or eight compression stages and four turbines, or six compression stages and three turbines, or four compression stages and three turbines.

9. The device as claimed in claim 1, wherein the cycle circuit comprises a return pipe having a first end connected to the outlet of one of the turbines and a second end connected to the inlet of one of the compression stages other than the first compression stage, for returning part of the flow of the cycle gas to the compression mechanism at an intermediate pressure level between the low pressure at the inlet of the compression mechanism and the higher pressure at the outlet of the compression mechanism.

10. The device as claimed in claim 9, wherein the return pipe is in a heat exchange relationship with the at least one member for cooling the cycle gas and/or the member for heating the expanded cycle gas.

11. The device as claimed in claim 1, wherein the cycle circuit comprises a partial bypass pipe for the flow of cycle gas, having a first end connected upstream of a turbine and a second end connected to the inlet of another turbine located downstream, said bypass pipe being configured to transfer part of the flow of cycle gas directly to the inlet of the coldest downstream turbine.

12. The device as claimed in claim 1, wherein the assembly of heat exchanger(s) comprises a plurality of heat exchangers which are disposed in series and in which two separate portions of the cycle circuit perform circulation simultaneously in countercurrent operation for respectively the cooling and the heating of the cycle gas, said plurality of heat exchangers forming a member for cooling the cycle gas and a member for heating the cycle gas.

13. The device as claimed in claim 1, wherein it comprises a second cooling system in a heat exchange relationship with at least part of the assembly of heat exchanger(s), said second cooling system comprising a circuit for heat-transfer fluid such as liquid nitrogen or a mixture of refrigerants.

14. A method for producing hydrogen at cryogenic temperature, notably liquefied hydrogen, using a device as claimed in claim 1, in which the pressure of the cycle gas at the inlet of the mechanism for compressing the cycle gas lies between two and forty bar abs and notably lies between eight and thirty five bar abs.

* * * * *